Dec. 7, 1943.   W. J. TANGERMAN   2,336,135
POWER TAKE-OFF FOR AIR CIRCULATING MEANS
Filed Feb. 15, 1941   2 Sheets-Sheet 1

Inventor:
William J. Tangerman
Attorney

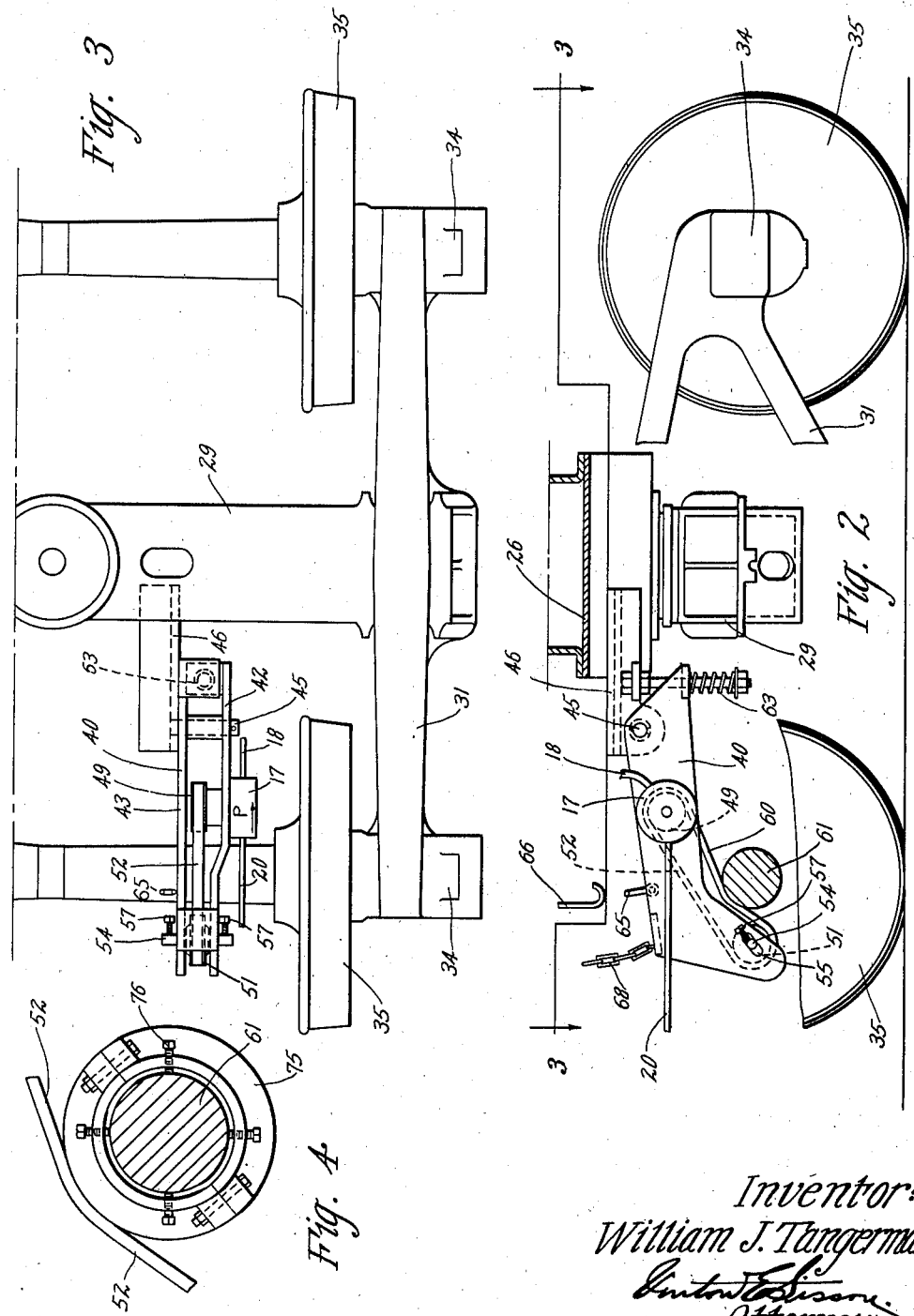

Patented Dec. 7, 1943

2,336,135

UNITED STATES PATENT OFFICE 2,336,135

POWER TAKE-OFF FOR AIR CIRCULATING MEANS

William J. Tangerman, Hammond, Ind., assignor to Standard Railway Equipment Manufacturing Company, Chicago, Ill., a corporation of Delaware Application February 15, 1941, Serial No. 379,018

4 Claims. (Cl. 74—221)

The invention relates to railway refrigerator cars and more particularly to such cars having fans in the lading or refrigerant compartment thereof for causing a circulation of air within the car for refrigerating, heating or ventilating the lading in the car wherein a belt or other movable means engages a wheel or axle of the truck of the car so as to be revolved thereby. Means suitable for the purpose are provided for transmitting such motion to the fan so as to cause rotation thereof.

A typical example of such a fan equipped refrigerator car is shown in Schwebs No. 2,136,894 of November 15, 1938.

A conventional refrigerator car is swively supported by trucks adjacent the opposite ends of the car so that the trucks may swing in a horizontal plane when the car rounds a curve in the track. One of the objects of the invention is to provide means to retain the above mentioned belt, or other movable means, in engagement with the wheel or axle of the truck when the car goes around a curve. A further object is to provide such means so that the belt or other movable means is attached to the car body but remains in operative engagement with the wheel or axle of the truck in any service position of the truck.

Vertically acting springs are associated with the truck to absorb the shocks caused by the car moving over a rough and uneven track and to yieldingly resist the tendency of the car to sway in service. Therefore, a further object is to provide means for the truck to move vertically relative to the car body without disengaging the belt or other movable means from the wheel or axle of the car truck.

A further object is to provide means to temporarily disengage the belt or other movable means from said wheel or axle so that, if desired, the car may be moved along the track without actuating the means which operates the fan. This is also desirable so that the fan operating means may be actuated when the car is standing still by driving the belt or other movable means with an electric motor while precooling the lading. The lading is precooled, as it is called by the trade, by icing the bunkers and circulating air by means of a fan between the ice compartment and the lading compartment. This is done while the car is standing still; that is, before it starts moving to its destination.

Another object is to provide means to support such a belt or other movable means from the car body independently of the car truck so that a truck may be removed and replaced without disturbing said belt or other movable means.

Other objects and advantages of my invention will appear from the following detailed description by referring to the accompanying drawings.

In the drawings:

Fig. 2 is a view similar to a portion of Fig. 1 having parts of the truck side frame and car wheel broken away to more clearly disclose the invention.

Fig. 3 is a plan view taken as indicated by the line 3—3 of Fig. 2.

Fig. 4 is similar to a portion of Fig. 2 but is drawn to a larger scale and shows a modified construction.

Figure 1:
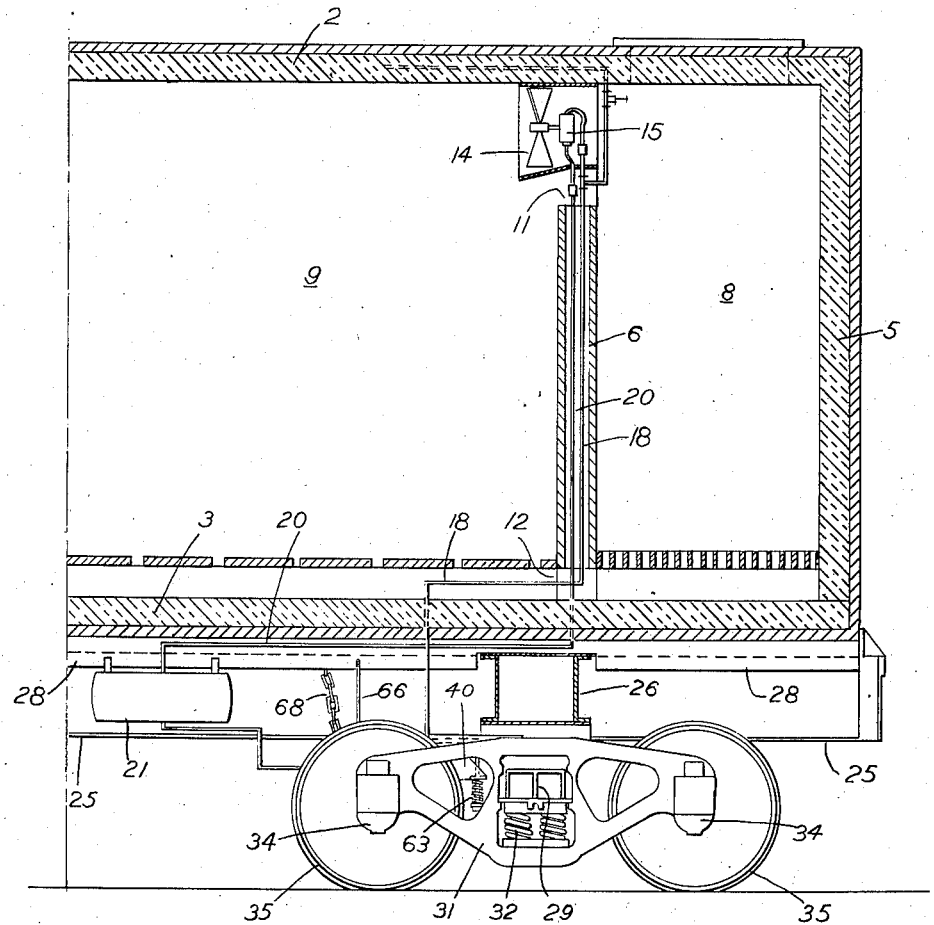
Fig. 1 is a longitudinal view of a part of a refrigerator car embodying my invention showing the car body in section and the truck in elevation.

The general parts of the refrigerator car shown include roof 2, floor 3, end wall 5 and bulkhead 6 spaced from the end wall 5 to divide the interior of the car into a refrigerant bunker 8 and a lading compartment 9. A similar bunker is preferably provided at the opposite end of the car. The bulkhead 6 is spaced from the roof 2 and floor 3 to provide openings 11, 12 for air circulation between the bunker 8 and lading compartment 9. A fan 14 is provided, preferably in the upper opening 11, to induce or accelerate such a circulation of air and means are provided for driving the fan. Such means, in the preferred form shown, comprises a hydraulic turbine 15 operatively connected to the fan 14 and driven by a fluid pumped under pressure to the turbine from a pump 17 driven by means hereinafter described. The pressure line from pump to turbine is indicated by 18 and the return line by 20, a reservoir 21 preferably being provided in the return line 20. The fan 14 may be driven by other means, such as a flexible shaft, if desired.

The underframe of the car includes the center sill 25 and body bolster 26 and the floor stringers 28 are supported in part by the bolster 26. The body bolster 26 is swively supported upon the truck bolster 29 which in turn is yieldingly supported on the truck side frames 31 by the helical springs 32 interposed therebetween. The side frames 31 are provided with bearings 34 on their opposite ends in which are journaled axles having the wheels 35 mounted thereon. A similar truck is provided at the opposite end of the car.

A bracket 40 comprised of a pair of spaced apart, vertically disposed plates 42, 43 is provided below the car body and pivotally mounted upon the pin 45 which, in turn, is secured to the horizontally extending angle member 46 attached to the lower side of the body bolster 26. The plate 42 has attached to the exterior thereof a hydraulic pump 17 having its pressure and suction openings connected to the pressure 18 and return 20 lines respectively as hereinabove described for the purpose of operating the fan 14. A pulley 49 is disposed preferably between the plates 42, 43 and operatively connected to the pump 17. An idler pulley 51 is also mounted between the plates 42, 43 and a belt 52, preferably of the V-type, operates upon the pulleys 49, 51. The shaft 54 for the idler pulley 51 is preferably mounted in slotted holes 55 and provided with screws 57 for adjusting the tension of the belt 52.

The lower side 60 of the belt 52 rests upon the car axle 61 so that the friction between the belt 52 and axle 61 rotates the pulley 49, thereby driving the pump 17 and operating the fan 14. The weight of the bracket 40 and associated parts provides pressure between the belt 52 and axle 61, which pressure is increased and held relatively uniform by the helical spring 63 interposed between the bracket 40 and angle member 46 and arranged to function as a compression spring. The force exerted by the spring 63 may be adjusted.

The bracket 40 is provided with an upstanding hook 65 which may be attached to the hook 66 depending from the car body when it is desired to disengage the belt 52 from the axle 61. Such a condition may exist when it is desired to move the car without operating the fan or when it is desired to drive the pump 17 by an extraneous motor for which attaching means are preferably provided as a part of the instant invention. The chain 68 extends between the bracket 40 and the car body with slack so as to support the bracket in case of failure of the belt 52.

Fig. 4 is a modified construction showing a means to obtain a higher pump speed. Since the pump speed is proportional to the peripheral velocity of the part engaged by the belt, a higher speed may be obtained by the provision of a split pulley 75 upon the axle 61. The belt 52 engages the pulley 75, which pulley is adjusted by the screws 76 to eliminate eccentricity with the axle 61. The pulley 75 preferably has considerable width in a direction parallel with the axis of the axle 61 so that the belt may move thereover in the same manner as it moves over the axle when the car rounds a curve.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. A power take-off device for transmitting power from the axle of a railway car truck to a mechanism on the car body, said device comprising a bracket pivotally mounted upon the car body to swing in a vertical plane, spaced apart pulleys mounted on said bracket, and a belt operating upon said pulleys, said belt resting upon an axle of the car truck between said pulleys so that friction between the belt and the axle moves the belt and rotates said pulleys, one of said pulleys adapted to be operatively associated with mechanism for operating an air circulating fan in the car.

2. A structure as defined in claim 1, including means to vary the pressure of the belt upon the axle.

3. A structure as defined in claim 1, including means to vary the pressure of the belt upon the axle, said last mentioned means comprising a spring exerting a force in a line eccentric from the pivot line of said bracket, and means to vary the compression of said spring.

4. A structure as defined in claim 1, including means to suspend said bracket from the car body so that the belt is out of engagement with the axle whereby said mechanism is inoperative.

WILLIAM J. TANGERMAN.